US007894620B2

(12) United States Patent
Yang

(10) Patent No.: US 7,894,620 B2
(45) Date of Patent: Feb. 22, 2011

(54) SPEAKER SET AND MOBILE PHONE INCORPORATING THE SAME

(75) Inventor: Tsung-Lung Yang, Taipei Hsien (TW)

(73) Assignee: Foxconn Technology Co., Ltd., Tucheng, Taipei County (TW)

(*) Notice: Subject to any disclaimer, the term of this patent is extended or adjusted under 35 U.S.C. 154(b) by 1141 days.

(21) Appl. No.: 11/557,919

(22) Filed: Nov. 8, 2006

(65) Prior Publication Data

US 2007/0242848 A1 Oct. 18, 2007

(30) Foreign Application Priority Data

Apr. 12, 2006 (CN) ........................ 2006 1 0060276

(51) Int. Cl.
*H04R 1/02* (2006.01)
*H04M 9/00* (2006.01)
*H04M 1/00* (2006.01)

(52) U.S. Cl. ........................ 381/345; 381/338; 381/351; 379/433.02; 455/569.1

(58) Field of Classification Search ................. 381/345, 381/351, 311, 337, 338, 349; 379/430, 433.02; 455/569.01

See application file for complete search history.

(56) References Cited

U.S. PATENT DOCUMENTS 6,493,456 B1 * 12/2002 Hansson ..................... 381/345
7,263,387 B2 * 8/2007 Ho et al. .................. 455/569.1
2005/0168958 A1 * 8/2005 Finney et al. ............... 361/752
2005/0190941 A1 9/2005 Yang
2005/0233781 A1 * 10/2005 Erixon et al. ............ 455/575.1

FOREIGN PATENT DOCUMENTS

TW 200408291 5/2004

* cited by examiner

*Primary Examiner*—Brian Ensey
*Assistant Examiner*—Sunita Joshi
(74) *Attorney, Agent, or Firm*—Jeffrey T. Knapp

(57) ABSTRACT

A mobile phone and an acoustic box structure thereof are provided. The mobile phone includes a shell containing a printed circuit board (PCB) and a hidden antenna therein. The acoustic box structure is disposed between the PCB and the hidden antenna. The acoustic box structure includes a main body, a loudspeaker accommodated in the main body and a frame located between the PCB and the main body. Due to the design of the frame, a hermetic space is framed between the PCB and the main body, thereby preventing sound waves generated by the loudspeaker from leaking out via a gap between the main body and the PCB. Furthermore, the frame made of shockproof materials decreases the resonant transfer between the PCB and the loudspeaker. Consequently, the quality of the sound made by the mobile phone is improved.

19 Claims, 7 Drawing Sheets

SPEAKER SET AND MOBILE PHONE INCORPORATING THE SAME

BACKGROUND OF THE INVENTION

1. Field of the Invention

The present invention relates generally to speaker sets for portable electronic devices, and more particularly to a speaker set for a mobile phone, which gives the mobile phone compact size and good sound quality.

2. Description of Related Art

Portable electronic devices, such as notebooks, CD players, MP3s and the like, have decreased both in size and weight over the past few years and are becoming ever more popular with travelers. This demand for smaller size with ever-increasing capability has required a tremendous effort to continually shrink many of the components contained within the device.

For a notebook computer, examples of component miniaturization are hard disk storage, circuitry, tracking devices, compact disc drives, speakers, and even connectors. The reduction in the size of many of these components has not been led to any serious problems, since technological advancements have allowed improved capability along with smaller size. However, portable electronic devices being designed today require multi-media features and provide the user with the same enjoyable experience as that experienced with conventional high quality desktop systems. Thus, the sounds emanating from a portable electronic device should provide as full a harmonic content as the original sounds. The production of low frequency sounds requires a large acoustic chamber for the movement of a large mass of air. As the device is reduced in size, the size of the acoustic chamber of the speaker set and the maximum power the speaker can handle are also accordingly reduced, resulting in both a reduction in loudness as well as a poorer overall quality of sound. However, increasing the device size to increase the size of the acoustic chamber for the speaker is very undesirable since it would strongly detract from the very characteristics that have helped to make these devices popular, namely size and weight. Thus the size of the device is at odds with high capability sounds of the speaker.

Consequently, inner spaces of the device which surround the speaker set are designed to communicate with the acoustic chamber so as to increase the size of the acoustic chamber but not increase the size of the device. However, the sound tends to leak from interstices formed between the components contained within the device and a housing of the device. The sounds leaked from the device interfere with the sounds dissipating from vent holes of the device, which decreases the overall sound quality of the device.

Therefore, a portable electronic device having a compact size and good sound quality is needed.

SUMMARY OF THE INVENTION

The present invention relates, in one respect, to a mobile phone having compact size and good sound quality, and in another aspect, to a speaker set for the mobile phone. According to a preferred embodiment of the present invention, the mobile phone includes a casing containing a printed circuit board and an antenna therein, and a speaker set disposed between the printed circuit board and the antenna. The speaker set includes a shell, a loudspeaker accommodated in the shell, and a hollow frame. The hollow frame is sandwiched between a base wall of the shell and the printed circuit board so as to form an acoustic chamber for the loudspeaker therebetween.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
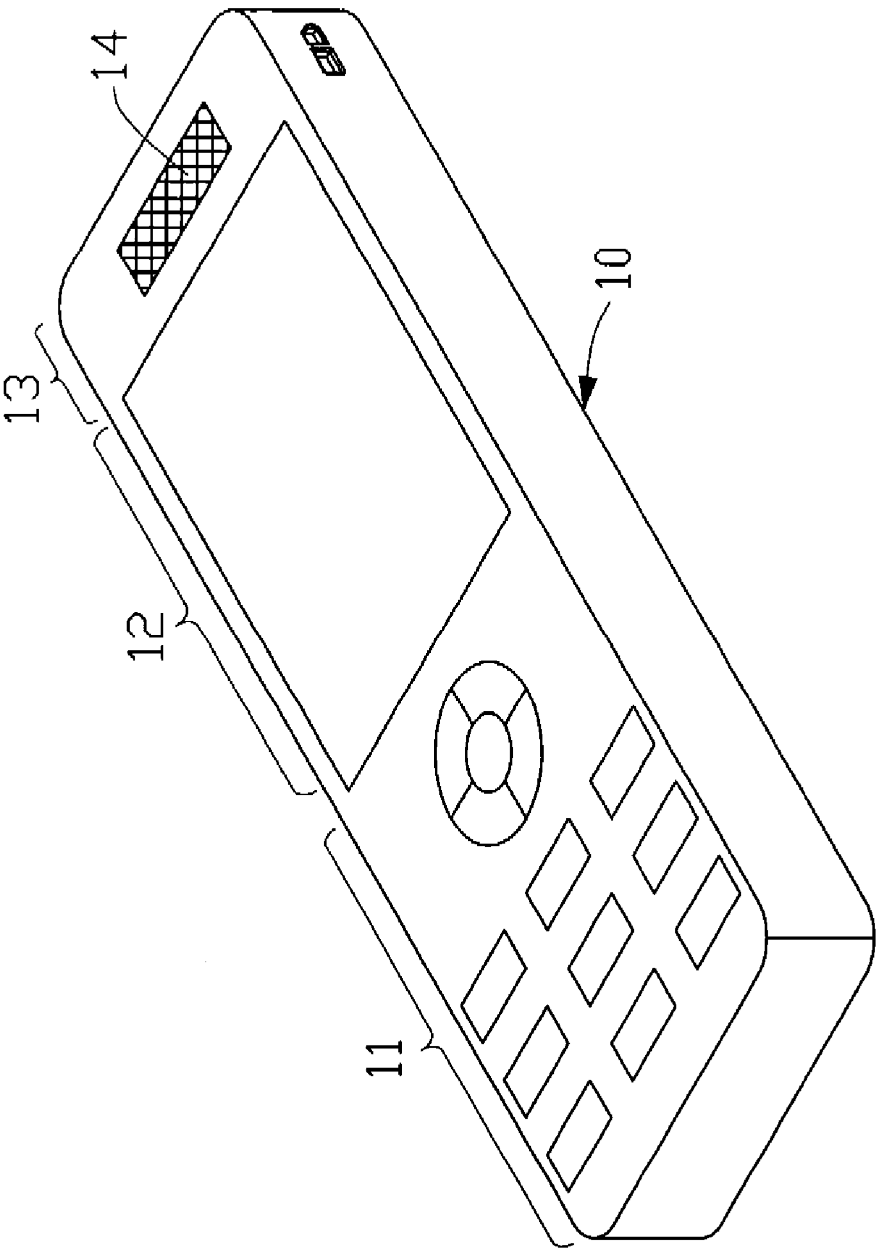
FIG. 1 is an isometric view of a mobile phone according to a preferred embodiment of the present invention.

Referring to FIG. 1, a mobile phone according to a preferred embodiment of the present invention is shown. The mobile phone includes a hollow casing 10 and a variety of elements enclosed therein. The casing 10 is substantially rectangular shaped in profile, and includes a keypad 11, a display panel 12, and a speaker section 13 respectively disposed at bottom, middle and top portions of the casing 10.

Figure 2:
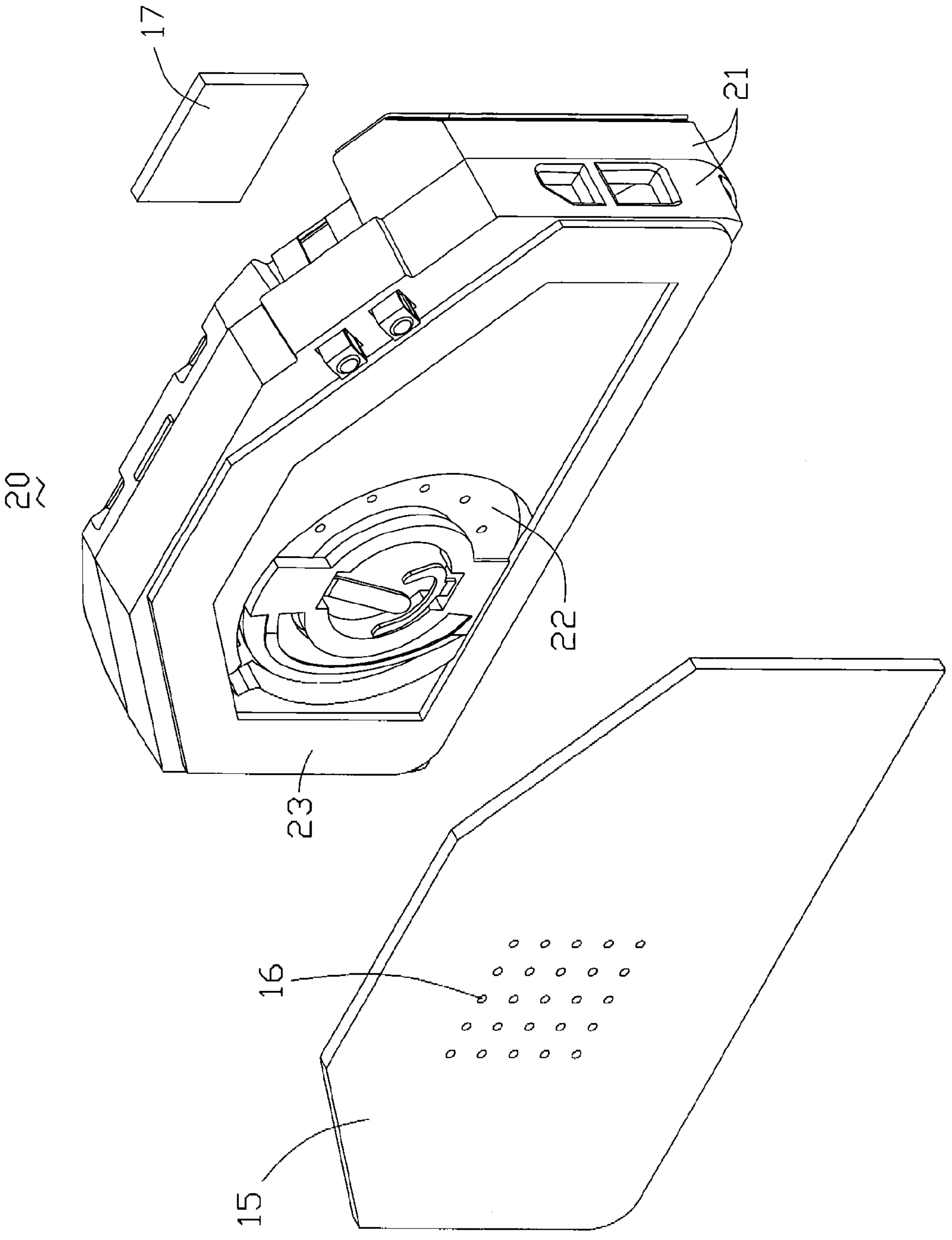
FIG. 2 is an assembled view of a speaker set and a printed circuit board and an antenna of the mobile phone of FIG. 1.

Referring to FIG. 2, a speaker set 20 which is disposed in the speaker section 13 of the casing 10 includes a hollow shell 21, a loudspeaker 22 accommodated in the shell 21, and a hollow frame 23 sandwiched between the shell 21 and a printed circuit board 15 of the mobile phone.

Figure 3:
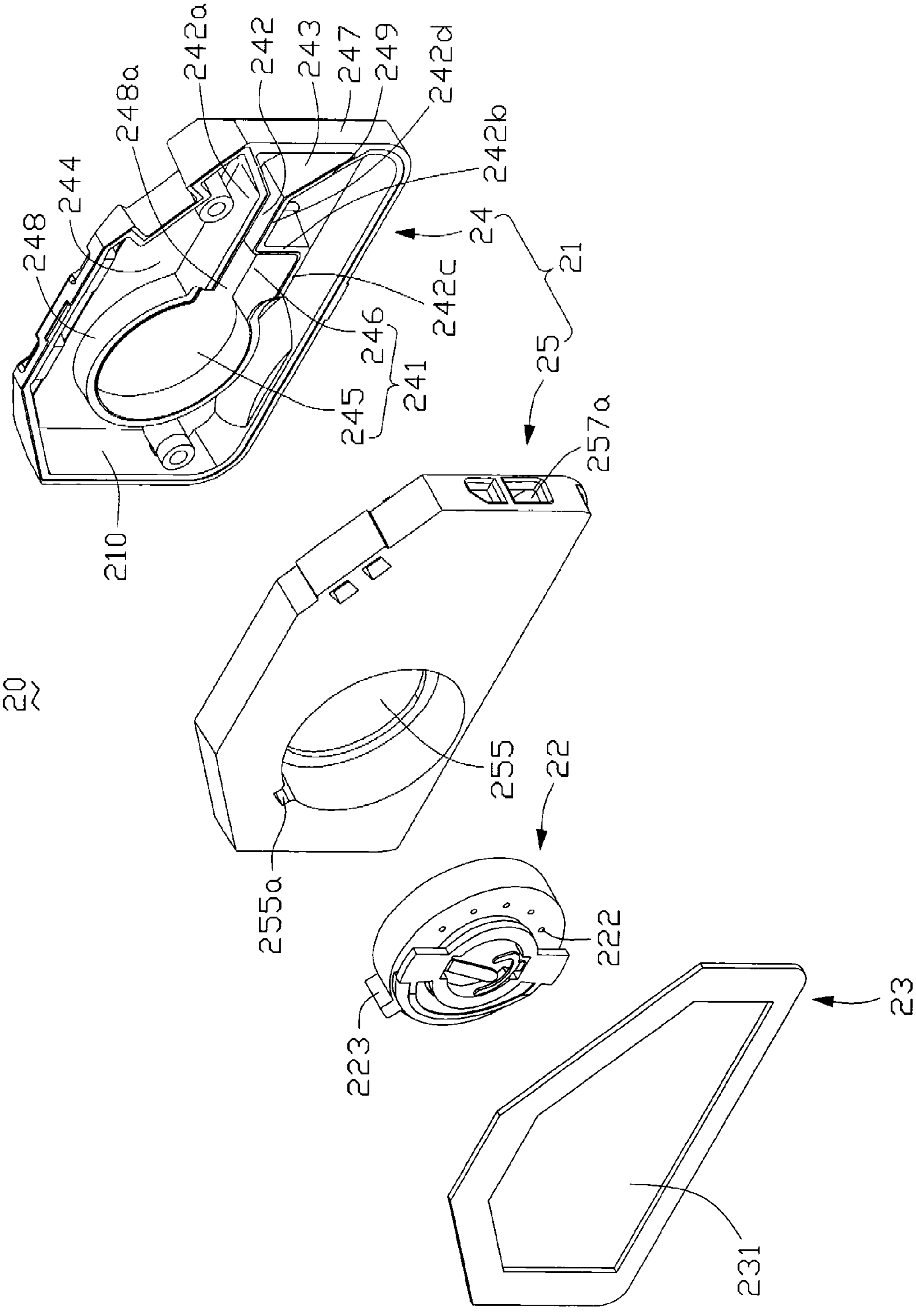
FIG. 3 is an exploded, isometric view of the speaker set of FIG. 2.
Figure 4:
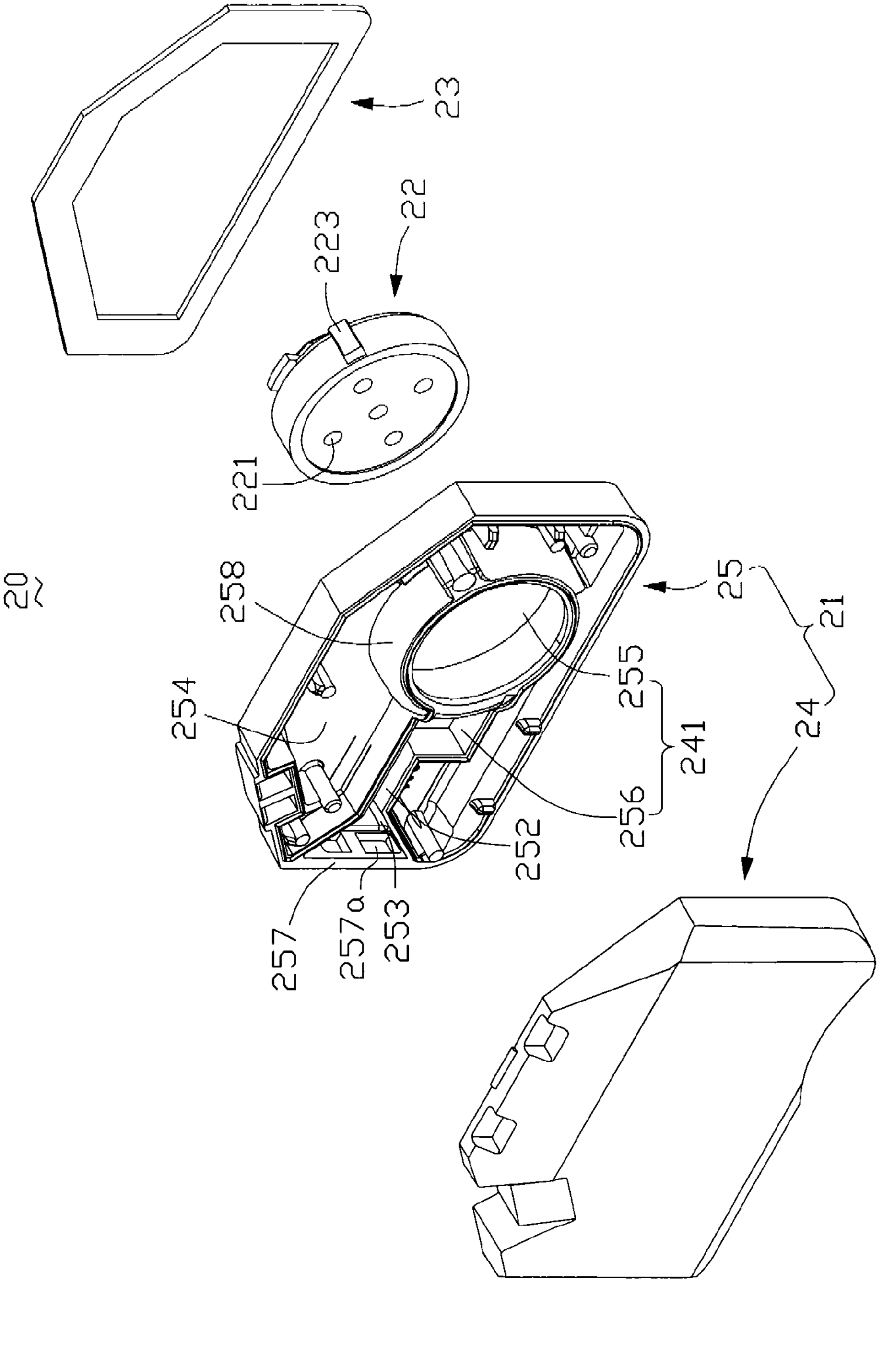
FIG. 4 is similar to FIG. 3, but viewed from another aspect thereof.

Referring to FIGS. 3 and 4, the shell 21 of the speaker set 20 consists of two sub-shells, i.e., a first sub-shell 24 and a second sub-shell 25 covering the first sub-shell 24.

The first sub-shell 24 includes a round chamber 245, a first rectangular chamber 246, a first channel 242 and a first pyramid chamber 243. The round chamber 245 is formed between a base wall 244 of the first sub-shell 24 and a first annular wall 248 perpendicularly extending from a middle portion of the base wall 244. The first annular wall 248 defines a cutout 248*a* therein, whilst a linear plate 242*a* and a serpentine plate 242*b* respectively extend from two sides of the cutout 248*a* towards a sidewall 247 of the first sub-shell 24. The serpentine plate 242*b* has a rectangular portion 242*c* disposed adjacent to the round chamber 245 and a linear portion 242*d* parallel to the linear plate 242*a*. The first rectangular chamber 246 is formed between the linear plate 242*a* and the rectangular portion 242*c* of the serpentine plate 242*b*, and communicates with the round chamber 245 via the cutout 248*a*. The first channel 242 is formed between the linear plate 242*a* and the linear portion 242*d* of the serpentine plate 242*b*. Two slant plates 249 respectively extend from distal ends of the linear plate 242a and the serpentine plate 242b towards the sidewall 247 of the first sub-shell 24. A distance between the slant plates 249 gradually increases from the distal ends of the linear plate 242a and the serpentine plate 242b towards the sidewall 247 of the first sub-shell 24, so that the first pyramid chamber 243 is formed therebetween.

The second sub-shell 25 includes a round hole 255, a second rectangular chamber 256, a second channel 252 and a second pyramid chamber 253. The second rectangular chamber 256, the second channel 252 and the second pyramid chamber 253 have substantially similar configurations with the respective first rectangular chamber 246, first channel 242 and first pyramid chamber 243 of the first sub-shell 24. The round hole 255 extends through a base wall 254 of the second sub-shell 25. A locking groove 255a is defined in the base wall 254 of the second sub-shell 25 and communicates with the round hole 255 at an end thereof. A second annular wall 258 extends from a front side of the base wall 254 of the second sub-shell 25. The second annular wall 258 surrounds the round hole 255 and cooperates with the round hole 255 to accommodate the loudspeaker 22 therein. The loudspeaker 22 has hermetic seal with the second annular wall 258, whilst the second annular wall 258 isolates an inner space thereof from the second rectangular chamber 256 so as to prevent sound waves generated by the loudspeaker 22 from leaking from the second annular wall 258 and the round hole 255 of the second sub-shell 25.

Moreover, the second sub-shell 25 defines a plurality of vent holes 257a through a sidewall 257 thereof so as to communicate the second channel 252 with the surrounding environment. Alternatively, the vent holes 257a may be defined in the sidewall 247 of the first sub-shell 24. The first sub-shell 24 is hermetically attached to the second sub-shell 25 via screws, adhesives or other appropriate means. A round chest is formed between the second annular wall 258 and the round chamber 245, whilst a rectangular chest is formed between the first and second rectangular chambers 246, 256, communicating with the round chest via the cutout 248a. The round chest and the rectangular chest cooperatively form an irregular-shaped front acoustic chamber 241 for the loudspeaker 22. A communicating channel is enclosed by the first and second channels 242, 252, and a pyramid chest is enclosed by the first and second pyramid chambers 243, 253. The front acoustic chamber 241, the communicating channel and the pyramid chest cooperatively form a hermetic Helmholtz resonance chamber. A hermetic surrounding chamber 210 is formed between sidewalls of the shell 21 and outer walls of the Helmholtz resonance chamber. The sound waves generated by the loudspeaker 22 drive the air in the Helmholtz resonance chamber to resonate with the Helmholtz resonance chamber at a natural frequency thereof and then diffuse towards the surrounding environment via the vent holes 257a.

The loudspeaker 22 defines a plurality of front tone holes 221 facing towards the first round chamber 245 of the first sub-shell 24 and a plurality of rear tone holes 222 opposite to the front tone holes 221. The loudspeaker 22 electrically connects with the circuit board 15 so as to receive electrical signals from the circuit board 15 and convert the electric signals into acoustic signals. The acoustic signals drive a diaphragm (not shown) of the loudspeaker 22 to oscillate so as to generate sound waves. The sound waves are transmitted from the loudspeaker 22 via the front and rear tone holes 222. The circuit board 15 and the speaker section 13 of the casing 10 respectively define a plurality of through holes 16, 14 corresponding to the rear tone holes 222 of the loudspeaker 22. The loudspeaker 22 extends an ear 223 from a side thereof. The ear 223 is received in the locking groove 255a of the second sub-shell 25 so as to prevent the loudspeaker 22 from rotating in the round hole 255 of the second sub-shell 25.

The hollow frame 23 is sandwiched between a rear side of the base wall 254 of the second sub-shell 25 and the circuit board 15. The hollow frame 23 can be made of anti-vibration materials such as rubber, or glass fiber cloth and has a similar periphery configuration to the periphery configuration of the second sub-shell 25 when viewed from on top. The hollow frame 23 is preferably designed to satisfy a larger volume enclosed therein and not decrease the anti-vibration capability thereof.

A rear acoustic chamber 231 for the loudspeaker 22 is formed between a front side of the circuit board 15, an inner wall of the hollow frame 23 and the rear side of the base wall 254 of the second sub-shell 25. The sound waves in the rear acoustic chamber 231 diffuse towards the surrounding environment via the through holes 16, 14 of the circuit board 15 and the speaker section 13 of the casing 10. Two layers of adhesive (not shown) are disposed between front and rear sides of the hollow frame 23 and respective portions of the front side of circuit board 15 and of the rear side of the base wall 254 of the second sub-shell 25 so that the hollow frame 23 has hermetic seal with the circuit board 15 and the second sub-shell 25. Thus, the sound waves generated by the loudspeaker 22 can not leak from sides of the rear acoustic chamber 231. Consequently, the sound waves in the rear acoustic chamber 231 diffuse towards the surrounding environment via the through holes 16, 14 of the circuit board 15 and the speaker section 13 of the casing 10 of the mobile phone. This prevents the sound waves in the front and rear acoustic chambers 241, 231 of the speaker set 20 from interfering with each other in the casing 10 of the mobile phone and thereby improves the quality of the sound made by the mobile phone. In addition, the hollow frame 23 weakens the vibration caused by the sound waves transferring towards the circuit board 15, which prevents the quality of the sound from being impaired by the vibration.

Figure 5:
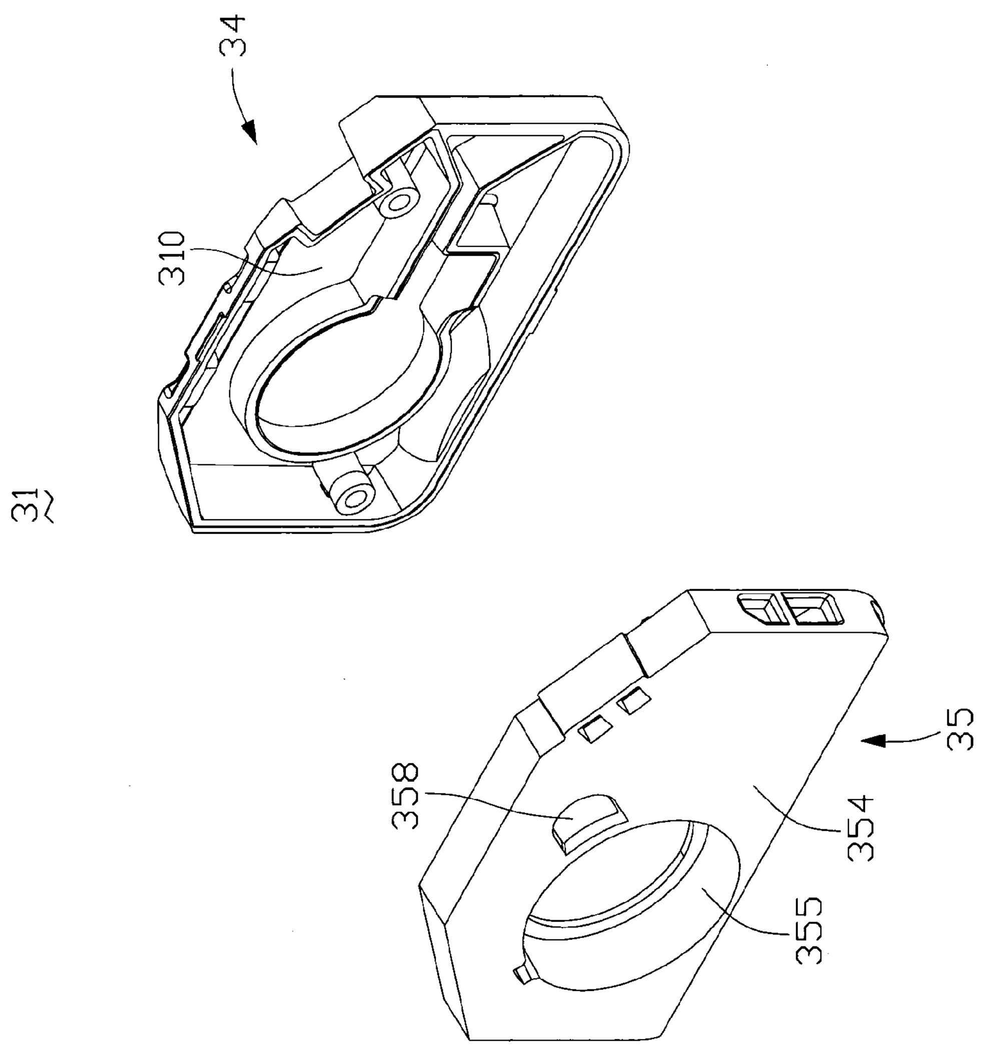
FIG. 5 is an exploded, isometric view of a shell of a speaker set according to a second embodiment of the present invention.
Figure 6:
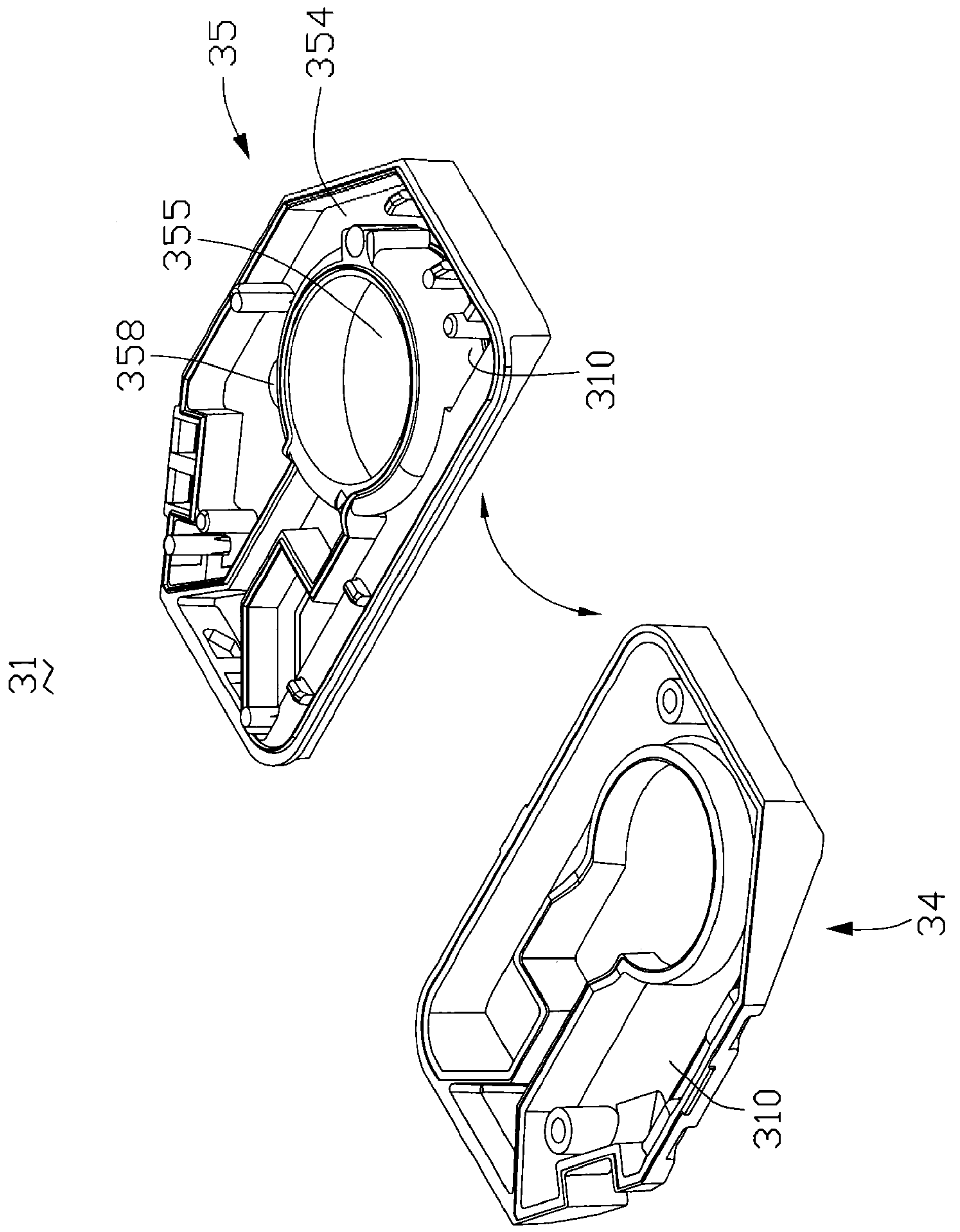
FIG. 6 is similar to FIG. 5, but viewed from another aspect thereof.
Figure 7:
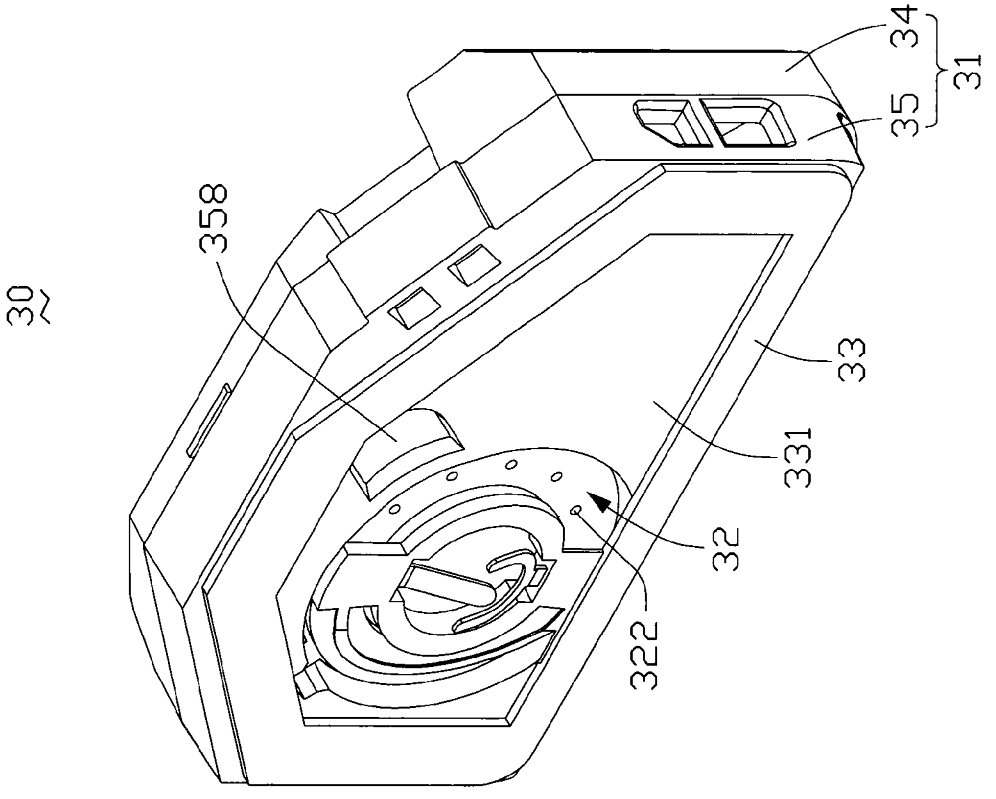
FIG. 7 is an assembled view of a speaker set incorporating the shell of FIGS. 5 and 6.

Referring to FIGS. 5 through 7, a second embodiment of the present speaker set 30 is shown. The difference between the second embodiment from the first embodiment is: an opening 358 is defined through the base wall 354 of the second sub-shell 35 so as to communicate the rear acoustic chamber 331 with the surrounding chamber 310 of the shell 31. The volume of the rear acoustic chamber 331 is therefore increased, which improves the low-frequency response of the loudspeaker 32 and accordingly improves the quality of the sound made by the mobile phone. Moreover, the opening 358 is disposed adjacent to the round hole 355 of the second sub-shell 35, which decreases the distance between the rear tone holes 322 of the loudspeaker 32 and the surrounding chamber 310 of the shell 31. The energy loss in dissipation of the sound waves is therefore decreased, which improves the loudness of the sound.

The present speaker set 20/30 is capable of being used in different kinds of portable electronic devices, such as personal digital assistants (PDAs), CD players, MP3s and MP4s, and more preferably in a mobile phone having a hidden antenna 17 therein. The antenna 17 is arranged at a front side of first-sub shell 24/34 and is spaced more than 7 mm from the circuit board 15 of the mobile phone so as to prevent electromagnetic interference between the circuit board 15 and the antenna 17. The speaker set 20/30 is positioned in the space formed between the antenna 17 and the circuit board 15 so as to save space in the mobile phone. In addition, the hollow frame 23/33 prevents the quality of the sound from being impaired by the vibration between the loudspeaker 22/32 and the circuit board 15. Consequently, the mobile phone is compact in size as well as having good sound quality.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of portions within the principles of the invention to the full extent indicated by the broad general meaning of the terms in which the appended claims are expressed.

What is claimed is:

1. A speaker set configured for a mobile phone comprising:

a hollow shell defining a Helmholtz resonance chamber and a surrounding chamber therein, the surrounding chamber isolated from the Helmholtz resonance chamber;

a loudspeaker accommodated in the shell; and a hollow frame configured for being sandwiched between one side of the shell and a printed circuit board of the mobile phone so as to form a hermetic acoustic chamber therebetween;

wherein front and rear sides of the loudspeaker face towards the Helmholtz resonance chamber and the acoustic chamber, respectively, the Helmholtz resonance chamber and the acoustic chamber are isolated by the loudspeaker, the shell defines an opening through a base wall thereof, and the opening communicates the acoustic chamber with the surrounding chamber.

2. The speaker set as described in claim 1, wherein the frame has a similar periphery configuration to the periphery configuration of the shell according to a top view thereof.

3. The speaker set as described in claim 1, wherein the frame is comprised of an anti-vibration material.

4. The speaker set as described in claim 3, wherein the frame is comprised of rubber or glass fiber cloth.

5. The speaker set as described in claim 1, wherein the shell comprises a first sub-shell and a second sub-shell, the first and second sub-shells cooperatively forming the Helmholtz resonance chamber for the loudspeaker.

6. The speaker set as described in claim 5, wherein the Helmholtz resonance chamber comprises an irregular-shaped acoustic chamber and a communicating channel communicating the irregular-shaped acoustic chamber with a surrounding environment via a plurality of vent holes defined through a sidewall of the shell.

7. The speaker set as described in claim 6, wherein the first sub-shell comprises a round chamber and a first rectangular chamber communicating with the round chamber, while the second sub-shell comprises a round hole receiving the loudspeaker therein, an annular wall surrounding the round hole and a second rectangular chamber, the irregular-shaped acoustic chamber being formed between the round chamber and the first rectangular chamber of the first sub-shell, and the annular wall and the second rectangular chamber of the second sub-shell.

8. The speaker set as described in claim 6, wherein the Helmholtz resonance chamber further comprises a pyramid chest formed between the channel and the vent holes of the sidewall of the shell.

9. The speaker set as described in claim 5, wherein the surrounding chamber surrounds the Helmholtz resonance chamber.

10. The speaker set as described in claim 9, wherein the loudspeaker defines a plurality of tone holes, the opening is disposed adjacent to the tone holes of the loudspeaker.

11. A mobile phone comprising:

a casing containing a printed circuit board and an antenna therein; and a speaker set disposed between the printed circuit board and the antenna and comprising:

a shell defining a Helmholtz resonance chamber and a surrounding chamber therein, the surrounding chamber isolated from the Helmholtz resonance chamber;

a loudspeaker accommodated in the shell; and a hollow frame sandwiched between a base wall of the shell and the printed circuit board so as to form an acoustic chamber for the loudspeaker therebetween;

wherein front and rear sides of the loudspeaker face towards the Helmholtz resonance chamber and the acoustic chamber, respectively, the Helmholtz resonance chamber and the acoustic chamber are isolated by the loudspeaker, the shell defines an opening through a base wall thereof, and the opening communicates the acoustic chamber with the surrounding chamber.

12. The mobile phone as described in claim 11, wherein the frame is comprised of rubber or glass fiber cloth.

13. The mobile phone as described in claim 11, wherein the shell comprises a first sub-shell and a second sub-shell, the first and second sub-shells cooperatively forming the Helmholtz resonance chamber for the loudspeaker.

14. The mobile phone as described in claim 13, wherein the Helmholtz resonance chamber comprises an irregular-shaped acoustic chamber and a communicating channel communicating the irregular-shaped acoustic chamber with the surrounding environment.

15. The mobile phone as described in claim 14, wherein the irregular-shaped acoustic chamber comprises a round chest and a rectangular chest communicating with the round chest at one side thereof.

16. The mobile phone as described in claim 13, wherein the surrounding chamber surrounds the Helmholtz resonance chamber.

17. The mobile phone as described in claim 16, wherein the loudspeaker defines a plurality of tone holes facing towards the acoustic chamber, the opening being disposed adjacent to the tone holes of the loudspeaker.

18. The speaker set as described in claim 1, wherein the loudspeaker defines a plurality of front tone holes at one side thereof facing towards the hermetic acoustic chamber and further defines a plurality of rear tone holes at the opposite side thereof facing towards the Helmholtz resonance chamber.

19. The speaker set as described in claim 7, wherein the base wall of the shell defines a locking hole in communication with the round hole, the loudspeaker comprises an ear extending from one side thereof, and the ear is received in the locking groove.

* * * * *